(12) United States Patent
Schur et al.

(10) Patent No.: US 12,233,916 B2
(45) Date of Patent: *Feb. 25, 2025

(54) METHOD AND SYSTEM FOR DETERMINING A MOVER MODEL FOR MOTION FORECASTING IN AUTONOMOUS VEHICLE CONTROL

(71) Applicant: FORD GLOBAL TECHNOLOGIES, LLC, Dearborn, MI (US)

(72) Inventors: Randall Schur, Pittsburgh, PA (US); Constantin Savtchenko, Sewickley, PA (US)

(73) Assignee: Ford Global Technologies, LLC, Dearborn, MI (US)

(*) Notice: Subject to any disclaimer, the term of this patent is extended or adjusted under 35 U.S.C. 154(b) by 70 days.

This patent is subject to a terminal disclaimer.

(21) Appl. No.: 18/065,031

(22) Filed: Dec. 13, 2022

(65) Prior Publication Data

US 2023/0111354 A1    Apr. 13, 2023

Related U.S. Application Data

(63) Continuation of application No. 17/104,994, filed on Nov. 25, 2020, now Pat. No. 11,554,794.

(51) Int. Cl.
*B60W 60/00* (2020.01)

(52) U.S. Cl.
CPC .... *B60W 60/0027* (2020.02); *B60W 60/0011* (2020.02)

(58) Field of Classification Search
CPC ...................... B60W 60/0027; B60W 60/0011
See application file for complete search history.

(56) References Cited

U.S. PATENT DOCUMENTS

| 10,496,766 B2 | 12/2019 | Levinson et al. |
| 2010/0017180 A1* | 1/2010 | Randler ............... G01S 13/726 703/8 |

(Continued)

OTHER PUBLICATIONS

Gonzalez et al., "A Review of Motion Planning Techniques for Automated Vehicles," published in IEEE Transactions on Intelligent Transportation Systems, vol. 17, No. 4 (Apr. 2016). (Abstract).

(Continued)

*Primary Examiner* — Brian P Sweeney
*Assistant Examiner* — Steven Vu Nguyen
(74) *Attorney, Agent, or Firm* — Frank A. MacKenzie; Brooks Kushman, P.C.

(57) ABSTRACT

This document discloses system, method, and computer program product embodiments for operating a vehicle, comprising: using kinematic models to generate forecasted trajectories of an actor (the kinematic models being respectively associated with different actor types that are assigned to an actor detected in an environment of the vehicle); selecting a first kinematic model based on the forecasted trajectories and a kinematic state of the actor; using the first kinematic model to predict a first path for the actor; selecting a second kinematic model responsive to movement of the actor no longer being consistent with typical movement of an object of one of the different actor types that is associated with the first kinematic model; using the second kinematic model to predict a second path for the actor; and controlling operations of the vehicle based on the first and second paths.

16 Claims, 5 Drawing Sheets

(56) References Cited

U.S. PATENT DOCUMENTS

| | | | |
|---|---|---|---|
| 2011/0246156 A1 | 10/2011 | Zecha et al. | |
| 2011/0313664 A1* | 12/2011 | Sakai | B60W 40/02 |
| | | | 701/301 |
| 2013/0054106 A1 | 2/2013 | Schmudderich et al. | |
| 2018/0374359 A1* | 12/2018 | Li | G06V 10/7788 |
| 2020/0082248 A1 | 3/2020 | Villegas et al. | |
| 2020/0142405 A1 | 5/2020 | Havens et al. | |
| 2020/0249674 A1 | 8/2020 | Dally et al. | |
| 2021/0146963 A1 | 5/2021 | Li et al. | |
| 2021/0302974 A1 | 9/2021 | Di Cairano et al. | |
| 2021/0380142 A1* | 12/2021 | Ramamoorthy | B60W 50/0097 |

OTHER PUBLICATIONS

International Search Report and Written Opinion mailed Feb. 22, 2022 in International Appl. No. PCT/US2021/057909.

Khan Academy, "Choosing Kinematic Equations" (video) available at https://www.khanacademy.org/science/high-school-physics/one-dimensional-motion-2/motion-with-constant-acceleration-2/v/choosing-kinematic-equations accessed online Nov. 16, 2020.

Ljungqvist et al., "A Path Planning and Path-Following Control Framework For a General 2-Trailer with a Car-Like Tractor", published at arXiv:1094.01651v2, Jun. 25, 2019.

Pepy, R., et al., "Path Planning Using a Dynamic Vehicle Model", 2006 2nd International Conference on Information & Communication Technologies, Damascus, 2006, pp. 781-786, doi: 10.1109/ICTTA.2006.1684472.

Ramamoorthy, S., et al., "Autonomous vehicle planning and prediction (English)" Apr. 23, 2020. Machine OCR of WO 2020/079066 A1.

Yurtsever et al., "A Survey of Autonomous Driving: Common Practices and Emerging Technologies," in IEEE Access, vol. 8, pp. 58443-58469, 2020, doi: 10.1109/ACCESS.2020.2983149.

\* cited by examiner

METHOD AND SYSTEM FOR DETERMINING A MOVER MODEL FOR MOTION FORECASTING IN AUTONOMOUS VEHICLE CONTROL

CROSS-REFERENCE TO RELATED APPLICATIONS

The present application is a Continuation Application of and claims the benefit of U.S. patent Ser. No. 17/104,994 which was filed on Nov. 25, 2020, now U.S. Pat. No. 11,554,794 issued Jan. 17, 2023. The content of this Patent Applications is incorporated herein by reference in its entirety.

BACKGROUND

Autonomous vehicle (AV) control systems rely on a complex system of sensors to detect, classify, and predict actions of other movers in the environment. Whether the AV is fully autonomous or semi-autonomous, the vehicle's autonomous functions will consider the likely trajectories of other actors when planning a path for the vehicle and/or initiating a reactive measure in response to the other actor.

To predict the trajectory of another actor, the AV will select a kinematic model that is appropriate for the other actor. Kinematic chain motion models, commonly referred to simply as kinematic models, are mathematical models that describe the motion of objects, regardless of force. The AV can use a kinematic model to predict the actor's position and orientation over time in view of various parameters.

An AV will store various kinematic models in its onboard or remotely accessible memory, and each model will be associated with one or more different classes of actors. For example, a kinematic model for a pedestrian will typically be different from the model for a bicyclist, which will typically be different from the model for a sedan, which will typically be different from the model for a tractor-trailer, etc. When the AV perceives an actor, it will classify the actor, and it will then use the classification to select the appropriate kinematic model that the AV will apply to predict the actor's motion. However, there may be times in when a particular actor could fall within two or more classifications. For example: a person who is walking a bicycle could be classified as a pedestrian or a cyclist; a person on roller skates be classified as a pedestrian or as something else such as a scooter operator, skateboarder or cyclist. If the AV does not select the appropriate kinematic model for a particular actor, the AV's ability to forecast that actor's motion will be less reliable.

This document describes methods and systems that are directed to addressing the problems described above, and/or other issues.

SUMMARY

Methods of determining which kinematic model an autonomous vehicle (AV) should use to predict motion of a detected moving actor are disclosed. One or more sensors of a perception system of the AV sensors will collect information about an environment in which the vehicle is positioned. The AV will also have access to a data store containing a library of kinematic models. A processor of the AV will process the sensor data captured by the sensors to identify, in the data, information indicating that an actor that is proximate to the vehicle. The system will assign one or more probable classes to the actor, and it will process the information to determine a kinematic state of the actor. The system will then access the library of kinematic models, and it will query the library to return one or more kinematic models that are associated with each of the probable classes of the actor. When the library returns two or more kinematic models in response to the querying, the system will apply each of the returned kinematic models to predict trajectories of the actor. The system will then evaluate each of the forecasted trajectories of the actor against the kinematic state of the actor to select one of the returned kinematic models. The system will then use the selected kinematic model to predict a path for the actor, and the AV will use the predicted path for the actor to plan motion of the vehicle.

After a period of time, the system may receive, from the perception system sensors, updated information about the actor. The system may then process the updated information to determine an updated kinematic state of the actor. When the updated kinematic state of the actor does not correspond to the selected kinematic model, the system may select a different kinematic model that corresponds to at least one of the possible classes for the actor, and it may use the different kinematic model to predict an updated path for the actor.

In some embodiments, in applying each of the returned kinematic models to forecast trajectories of the actor, the system may create a hybrid kinematic model that includes a path follower of a first one of the returned kinematic models, and a kinematics evaluator of a different one of the returned kinematic models. Then, when selecting one of the returned kinematic models, the system may select the hybrid kinematic model. The system may then save the hybrid kinematic model to the library in association with at least one of the probable classes of the actor.

As an alternative to creating a hybrid kinematic model, the system may use the forecasted trajectories of the actor to create a new kinematic model. The system may do this by: accessing a dataset of observed trajectories; using a machine learning architecture to build the new kinematic model; creating a loss function based on comparing the forecasted trajectories from the returned kinematic models to the observed trajectories in the dataset; and training the new kinematic model on the loss function. If so, then when selecting one of the returned kinematic models the system may select the new kinematic model.

In some embodiments, when evaluating each of the forecasted trajectories of the actor against the kinematic state of the actor to select one of the returned kinematic models, the system may determine a level of divergence of each forecasted trajectory from an associated reference path, identify the forecasted trajectory having the least divergence from its associated reference path, and select the returned kinematic model that produced the forecasted trajectory having the least divergence from its associated reference path. Optionally, before determining the levels of divergence of each forecasted trajectory, the system may determine the associated reference path for each forecasted trajectory as a reference path that corresponds to a class of actor with which the forecasted trajectory's kinematic model is associated.

In some instances, the library may return only a single kinematic model in response to the querying. When this happens, the system will apply the single kinematic model to forecast the trajectory of the actor for that instance.

In some embodiments, when assigning the one or more probable classes to the actor, the system may use the detected characteristics to determine a level of probability for each of the probable classes. If so, then when querying the library to return the one or more kinematic models, the system may query the library to return any kinematic model having a criterion indicating that the model may be used for any actor with a class-probability correlation that matches one of the levels of probability for the actor.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
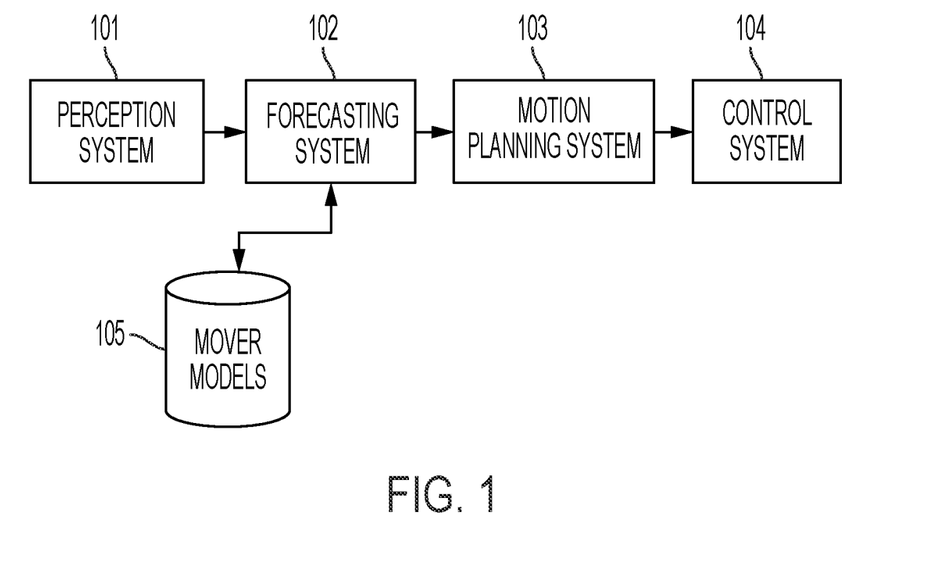
FIG. 1 is a block diagram that illustrates example subsystems of an autonomous vehicle.

FIG. 1 is a high-level overview of autonomous vehicle (AV) subsystems that are relevant to the discussion below. Specific components within such systems will be described in the discussion of FIG. 5 later in this document. An AV includes a perception system 101 that includes sensors that capture information about moving actors and other objects that exist in the vehicle's immediate surroundings. Example sensors include cameras, LiDAR sensors and radar sensors. The data captured by such sensors (such as digital images, LiDAR point cloud data, or radar data) is known as perception data. The perception system may include one or more processors, and computer-readable memory with programming instructions and/or trained artificial intelligence models that will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in Yurtsever et al., "A Survey of Autonomous Driving: Common Practices and Emerging Technologies" (arXiv Apr. 2, 2020).

The vehicle's perception system 101 will deliver perception data to the vehicle's forecasting system 102. The forecasting system (which also may be referred to as a prediction system) will include processors and computer-readable programming instructions that are configured to process data received from the perception system and forecast actions of other actors that the perception system detects. The system may house any number of kinematic models to make these predictions for other actors, as will be described below.

The vehicle's perception system, as well as the vehicle's forecasting system, will deliver data and information to the vehicle's motion planning system 103 and control system 104 so that the receiving systems may assess such data and initiate any number of reactive motions to such data. The motion planning system 103 and control system 104 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

The vehicle's forecasting system 102 (and optionally any of the other vehicle systems) will have access to a data store with a library of mover models 105. The library of mover models 105 may be housed in a memory on-board the vehicle, in a memory of a remote electronic device with which the vehicle is communicatively connected, or a combination of these. The library of mover models will store any number of kinematic models, each of which is associated with one or more classes (i.e., actor types) such as pedestrian, bicyclist, automobile, tractor-trailer, etc.

Each kinematic model will include a path follower and a kinematic evaluator. The path follower is an algorithm (implemented in software code) that uses the current or predicted state of an actor and an idealized reference path to generate target commands for the actor. For example, in the context of forecasting vehicle motion, target commands may include the steering angle and target acceleration (which approximates throttle/brake input). These commands are then passed to the kinematic evaluator, which is a system of equations that takes the current or future predicted state of the actor, applies the target commands, and then generates a new predicted future state.

Each kinematic model will receive observed and inferred data about the actor, as well as a proposed reference path which may be generated using a priori data. Each model also may output a future predicted state for the actor.

By way of example, the system may store and use a first mover model, which we will refer to as "Model A". Model A may use the known pure pursuit algorithm as a path follower, and it may use the well known bicycle kinematic model as a kinematic evaluator. These are each popular and widely used algorithms both on their own and in combination for planning or forecasting vehicle motion. The system may use Model A for forecasting the motion of most vehicles, and most cyclists, and thus the system may associate Model A with those classes of actors.

Another example ("Model B") is a kinematic model that applies to very large vehicles like buses or tractor-trailers. Model B uses a different path following algorithm from Model A, and it particular an algorithm that more accurately represents the steering techniques of these large vehicles. (An example of such an algorithm is disclosed in Ljungqvist et al., "A Path Planning and Path-Following Control Framework For a General 2-Trailer with a Car-Like Tractor", published at arXiv: 1094.01651v2 25 Jun. 2019.) Model B uses the same kinematic evaluator as Model A. For some actors where we are uncertain about which model is most accurate, we may produce two sets of forecasts, one using Model A and one using Model B. If we then evaluate these models against observed data and determine that Model B is performing better, we may change the strategy and apply only Model B at a later time.

A third example kinematic model ("Model C") is designed for pedestrians. The path follower for Model C accounts for the fact that the actor may turn in any direction nearly instantaneously (for example, there is no maximum steering angle for a pedestrian). The kinematic evaluator similarly has different and fewer constraints than for Model A.

As will be described in the context of FIG. 2 below, when classifying an actor the vehicle's prediction system may identify two or more possible classes. For example, if the vehicle detects a person on a scooter, it may be unclear whether this should be considered to be a cyclist or a pedestrian, and thus it may not be clear which model is more appropriate. Prior solutions this would force a choice, which may end up not yield a reliable forecast. The process described in this document allows the vehicle's prediction system to propose forecasts using both Model A and Model, or to switch from one model to the other.

The methods of this document are not limited to the example kinematic models described above. Any number of other kinematic models may be used, and as explained below the system itself may develop new, hybrid kinematic models that incorporate elements from the kinematic models stored in its library.

Figure 2:
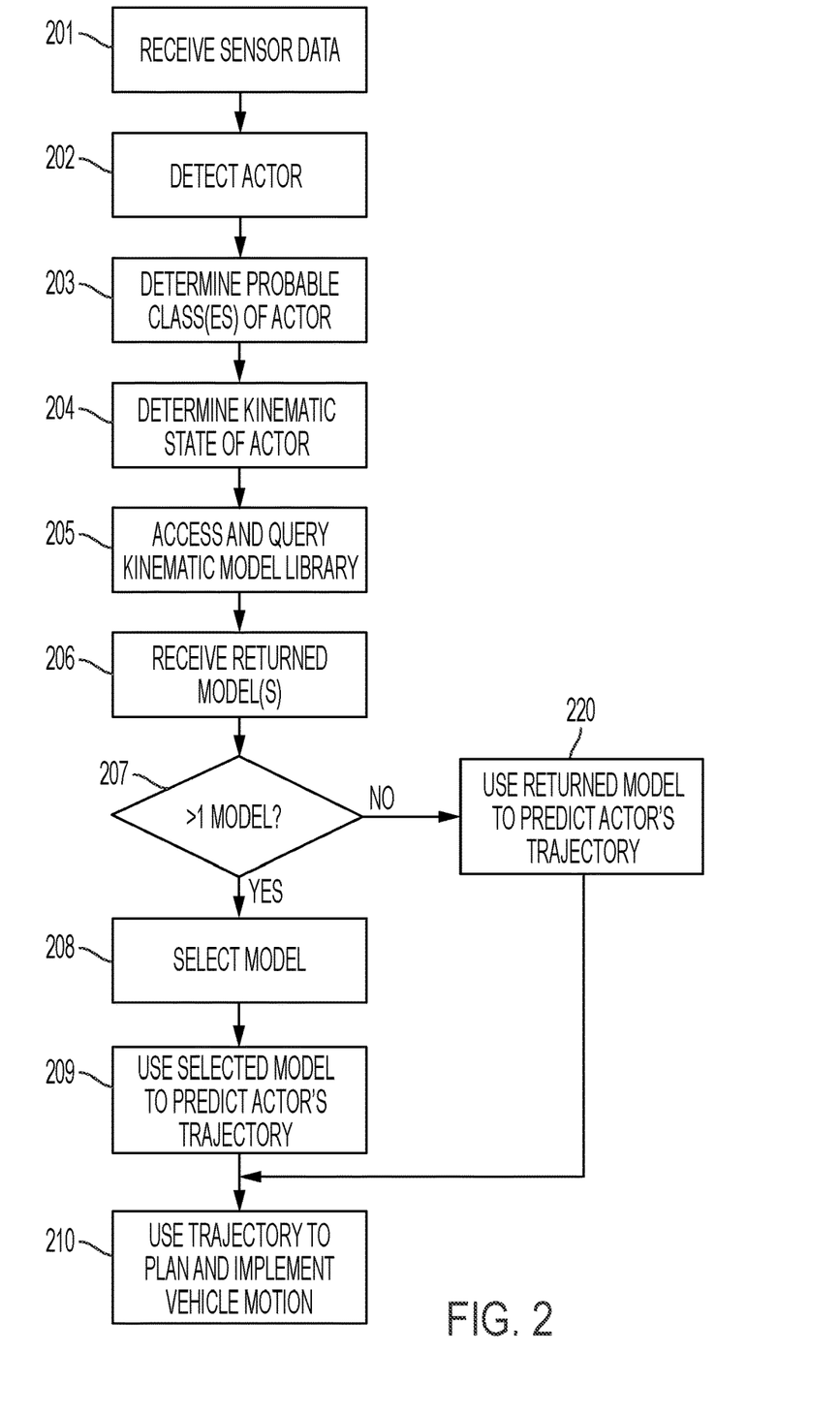
FIG. 2 illustrates an example process for selecting a kinematic model for a detected actor, and for using the selected model in planning motion of an autonomous vehicle.

FIG. 2 is a flowchart that illustrates a method of forecasting motion of an actor that may move in an environment of a vehicle, using system elements such as those described above. At 201, a perception system of a vehicle will receive sensor data via one or more sensors of the vehicle. As noted above, the sensor data may include images captured by a camera, LiDAR data, or other data that includes information about actors and other objects that are proximate to (i.e., within the sensors' range of) the vehicle. At 202 the system will process the sensor data to detect an actor that is proximate to the vehicle. The system also will assign one or more probable classes to the actor (203). The system may do this by detecting one or more characteristics of the actor and, when assigning the one or more probable classes to the actor, using the detected characteristics to determine a level of probability for each of the probable classes. Example methods of assigning probable classes include the object categorical labeling methods described above in the context of FIG. 1. In addition, the perception system will determine a kinematic state of the actor (204), yielding characteristics such as position, velocity, and acceleration of the actor. The system may do this by calculating coordinates for the actor in the sensed data and determining changes in those coordinates over a time window using known equations such as velocity=displacement/time, an acceleration=change in velocity/change in time.

Once the actor details are assessed, as noted above a forecasting system of the vehicle will accessing a library of kinematic models, in which each of the kinematic models is associated with one or more classes as described above. At 205 the system may access and query the library to return one or more kinematic models that are associated with each of the probable classes of the actor. At 206 the library will then return one or more kinematic models for use in forecasting the actor's movement. For example, when the perception system has determined that the actor may be one of multiple classes, each of which is associated with a level of probability, then when querying the library to return the one or more kinematic models, the forecasting system may request any kinematic model having a criterion indicating that the model may be used for any actor with a class-probability correlation that matches one of the levels of probability for the actor. Optionally, the forecasting system may only consider the probable classes having at least a threshold level of probability (such as at least 30%, or at least 40%, or some other threshold) to avoid considering models that are unlikely to be relevant to the actor.

If the library only returns a single kinematic model in response to the querying step (207:NO), then at 220 the system may apply the single kinematic model to forecast the trajectory of the actor.

On the other hand, when the library returns two or more kinematic models in response to the querying step (207: YES), then at 208 the system may select at least one of the returned models to forecast the trajectory of the actor at 209. At 210 the system may then use the actor's trajectory to plan and implement the vehicle's motion using methods such as those described above in the context of FIG. 1 and hardware such as that described below in the context of FIG. 4.

The system may select the model (at 208) using any of various processes. A simple process is to select the model that is associated with the class to which the perception system has assigned a highest probability for the actor. Alternatively, or in addition, the system may filtering out models associated with relatively low class probabilities (i.e., less than a threshold, or at least one or more standard deviations from the remaining possible models).

Figure 3A:
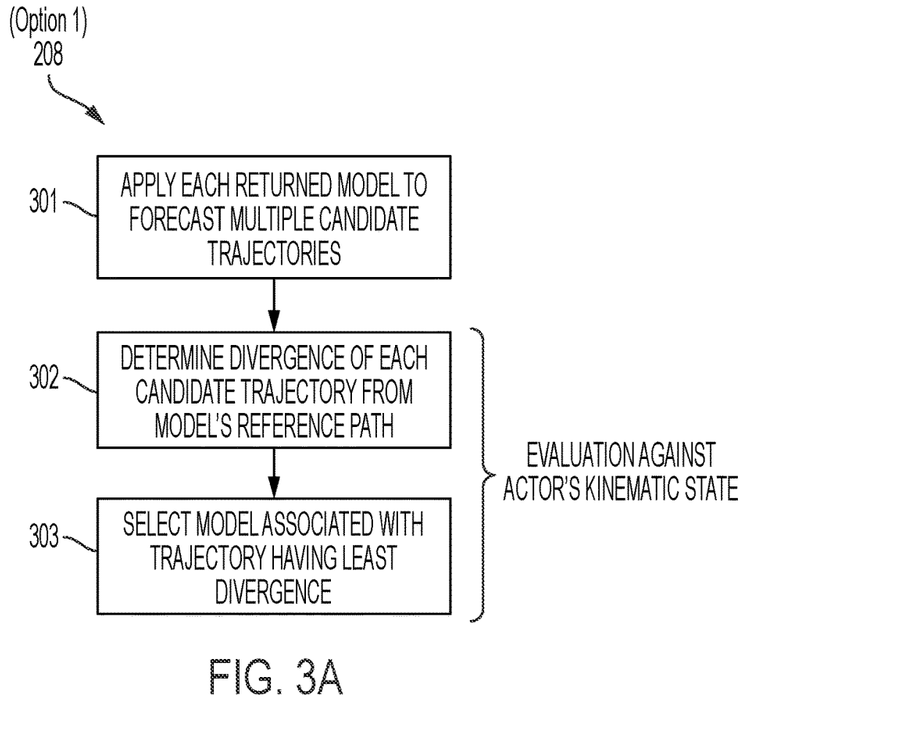
FIGS. 3A and 3B provide additional details for example model selection processes that are shown at a higher level in FIG. 2.

If multiple candidate models remain after the filtering, then to select the model at 208 the system may apply a process such as that shown in FIG. 3A. In this option for model selection, at 301 the system may apply each of the returned models to determine multiple candidate trajectories for the actor (that is, each model may provide one or more trajectories). In addition, the system may apply any given model multiple times, with different parameters, to provide multiple forecasts to determine the parameters and models that are most accurate. (By way of example, a large truck may have its axles placed in various positions under the truck, depending on its make and model. To account for multiple truck axle configurations, the system use a given model to predict various trajectories for each of multiple possible axle positions.)

The system may then evaluate each of the candidate trajectories of the actor against the kinematic state of the actor to select one of the returned kinematic models by: (a) at 302, determining a level of divergence of each forecasted trajectory from an associated reference path; (b) at 303, identifying the forecasted trajectory having the least divergence from its associated reference path; and (c) at 303 selecting the returned kinematic model that produced the forecasted trajectory having the least divergence from its associated reference path. The reference path will be an input to the model and be determined by examining (a) lane geometry, (b) current state of the actor (such as where the actor is in the lane), and (c) positions of other actors or obstacles in the road. Different types of actors may have different reference paths, and the system may determine a reference path that corresponds to a class of actor with which the forecasted trajectory's kinematic model is associated.

Figure 3B:
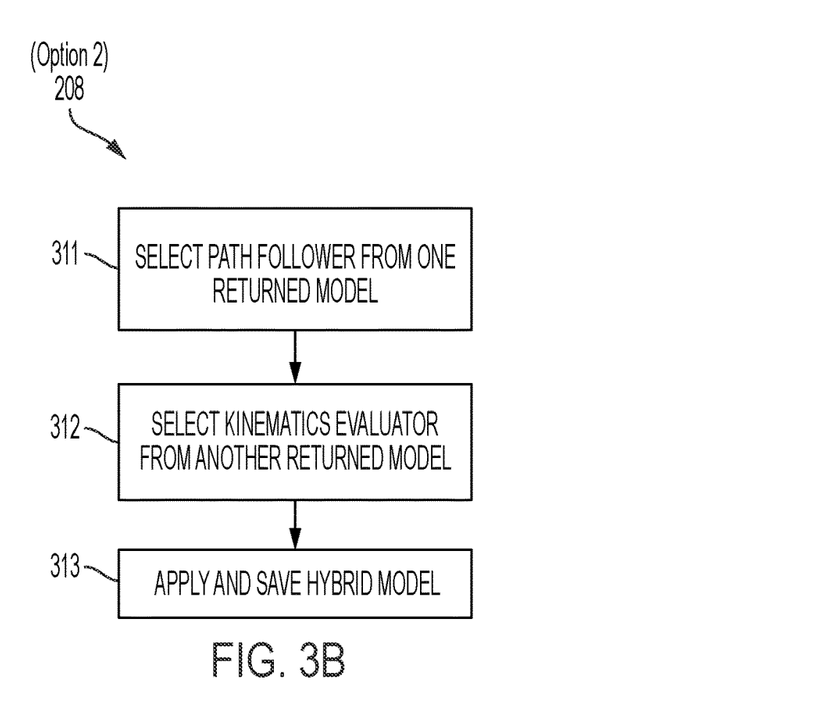

Another method for selecting a model from multiple candidate models is shown in FIG. 3B. In this option for model selection, at the system may create a hybrid kinematic model that includes: (a) a path follower of a first one of the returned kinematic models (311), and (b) a kinematics evaluator of a different one of the returned kinematic models (312). To determine the models from which the system will select these elements, the system may make trajectory predictions using multiple models, then observe the actor(s) for which the predictions were made. The models for which predictions most closely, or most frequently, matched the actual actions of the actor may be the ones from which these elements are selected. This process may be refined over time, as the system may repeatedly make predictions and compare them to actual evaluations, this updating the hybrid model to incorporate elements of those models that are most consistently accurate over time, that are most accurate.

As an alternative to either or both of steps 311 and 312 in FIG. 3B, the system may use a machine learning model to develop an entirely new path follower, a new kinematics evaluator, or an entirely new kinematic model. To develop a new model, the system may: (i) collecting (if not already available) and accessing a large dataset of observed trajectories of other actors; (ii) use a machine learning architecture to build a model that takes the observed data and reference path as input, and which provides a new predicted state as output; (iii) create a loss function, or evaluation criteria, based on comparing forecasted trajectories to observed trajectories to determine which of the trajectories are preferable; and (iv) train the model using this loss function. The machine learning architecture in step (ii) above may be, for example and without limitation, long short term memory (LSTM) or another artificial recurrent neural network (RNN) architecture. The metric used in step (iii) may be a Final Displacement Error calculation (that is, the distance between the end of the forecasted trajectory and the observed trajectory at some point in the future), or other metrics. The resulting model may then accept inputs and generate outputs similar to a hybrid model.

At 313, the system may then save this hybrid (or simply new) model to the library in association with at least one of the probable classes of the actor. The system also may use the hybrid model as the selected model for motion planning in step 209 of FIG. 2.

Figure 4:
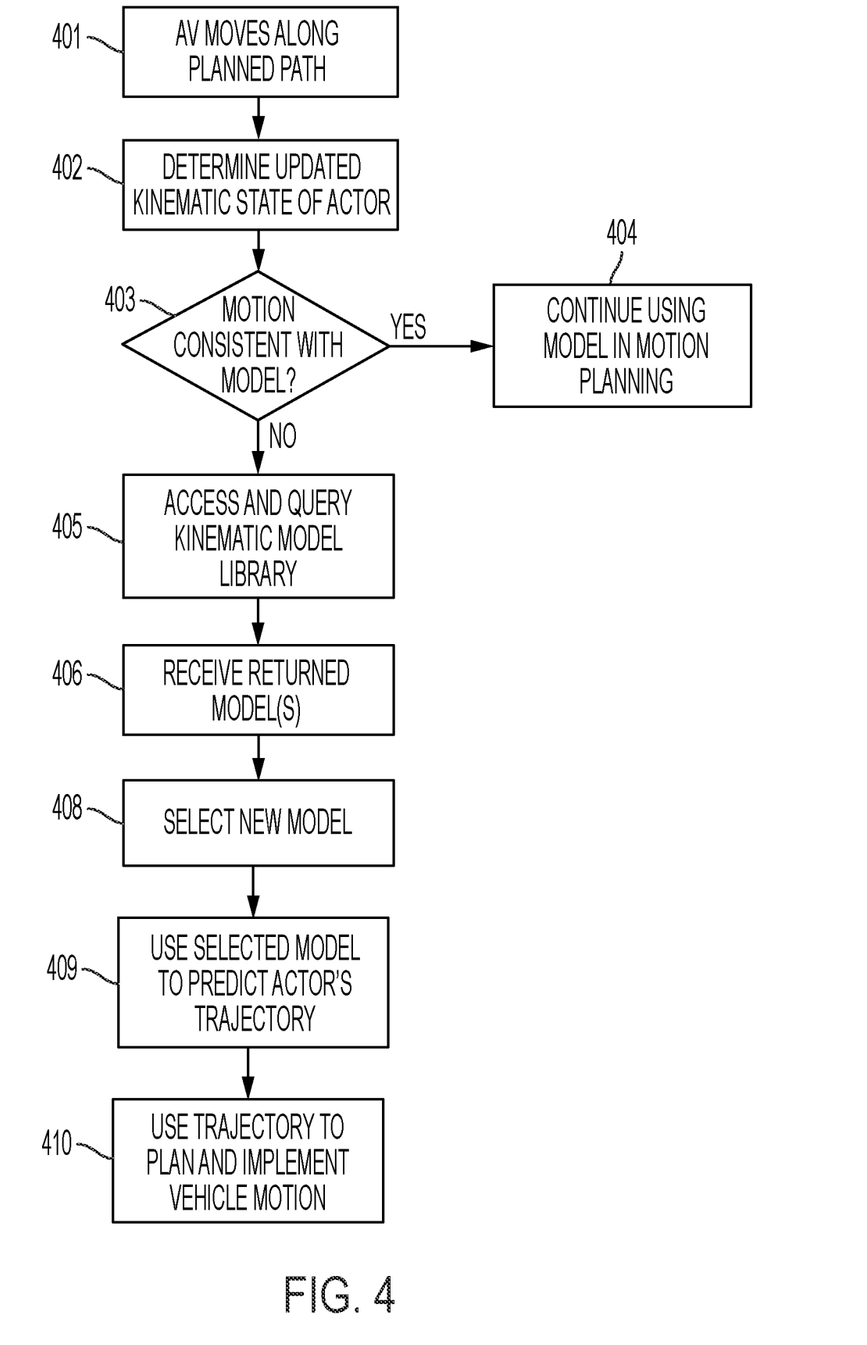
FIG. 4 illustrates an example process by which a vehicle may determine when to change the kinematic model that it is using to track an actor.

Once the system has selected a model and used the model to plan vehicle motion, the system may continue to observe data about the actor to determine whether to continue using the selected model, to select a new model, or to generate a new hybrid model. This process is illustrated in FIG. 4, in which as the AV moves along its planned path at 401, the vehicle's perception system continues to determine updated kinematic states of the actor at 402. At 403 the system may determine whether the updated kinematic state of the actor continues to correspond to the selected model. For example, if the system has been using a tractor-trailer model for the actor but the actor moved in a manner that is not possible (or typical) for a tractor trailer to do (such as sharply turn a corner), the system may determine that the tractor-trailer model is no longer appropriate for that actor. If the updated kinematic state of the actor is consistent with the model (403:YES), then at 404 system may then simply continue to use that model in path planning as described above. However, if the updated kinematic state of the actor is not consistent with the model (403:NO), then at 405 the system may access and query the kinematic model library to return one or more new models at 406. The system may then select a new model (406), use the selected model to predict the actor's trajectory (407), and use the trajectory to plan and implement the vehicle's motion (408), all using methods as described above in the context of FIG. 2.

Figure 5:
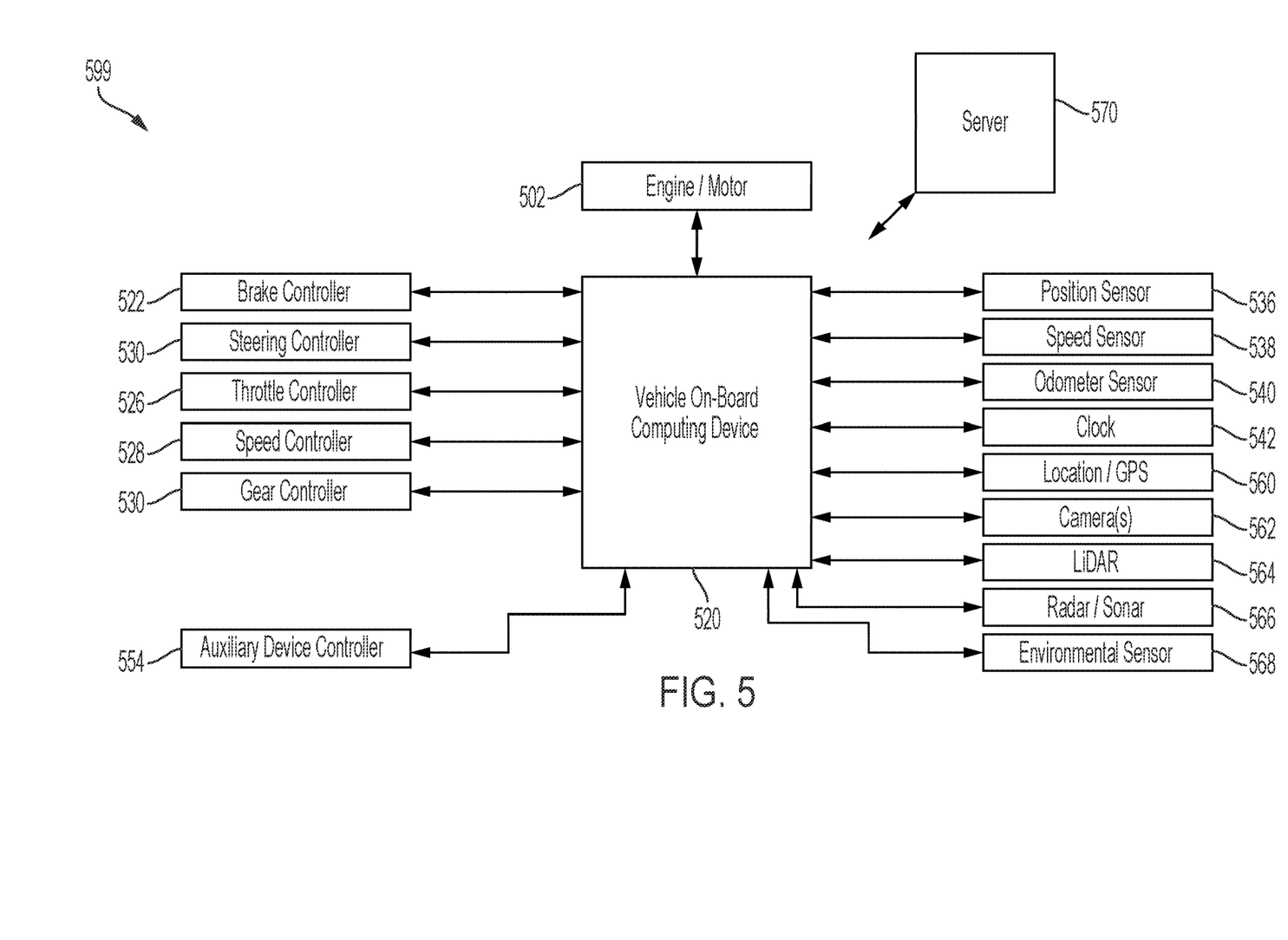
FIG. 5 illustrates example hardware components of an autonomous vehicle.

FIG. 5 illustrates an example system architecture 599 for a vehicle, such as an AV. The vehicle includes an engine or motor 502 and various sensors for measuring various parameters of the vehicle and/or its environment. Operational parameter sensors that are common to both types of vehicles include, for example: a position sensor 536 such as an accelerometer, gyroscope and/or inertial measurement unit; a speed sensor 538; and an odometer sensor 540. The vehicle also may have a clock 542 that the system uses to determine vehicle time during operation. The clock 542 may be encoded into the vehicle on-board computing device, it may be a separate device, or multiple clocks may be available.

The vehicle also will include various sensors that operate to gather information about the environment in which the vehicle is positioned. These sensors may include, for example: a location sensor 560 such as a global positioning system (GPS) device; object detection sensors such as one or more cameras 562; a LiDAR sensor system 564; and/or a radar and or and/or a sonar system 566. The sensors also may include environmental sensors 568 such as a precipitation sensor and/or ambient temperature sensor. The object detection sensors may enable the vehicle to detect moving actors and stationary objects that are within a given distance range of the vehicle 599 in any direction, while the environmental sensors collect data about environmental conditions within the vehicle's area of travel. The system will also include one or more cameras 562 for capturing images of the environment. Any or all of these sensors, together with one or more processors of the vehicle's on-board computing device 520 and programming instructions that, when executed by the processors, enable the computing system to classify objects in the perception data, may be considered to be the vehicle's perception system.

During a run of the vehicle, information is communicated from the sensors to an on-board computing device 520. The on-board computing device 520 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 520 may control braking via a brake controller 522; direction via a steering controller 124; speed and acceleration via a throttle controller 526 (in a gas-powered vehicle) or a motor speed controller 528 (such as a current level controller in an electric vehicle); a differential gear controller 530 (in vehicles with transmissions); and/or other controllers.

Geographic location information may be communicated from the location sensor 560 to the on-board computing device 520, which may then access a map of the environment that corresponds to the location information to determine known fixed features of the environment such as streets, buildings, stop signs and/or stop/go signals. Captured images from the cameras 562 and/or object detection information captured from sensors such as a LiDAR system 164 is communicated from those sensors) to the on-board computing device 520. The object detection information and/or captured images may be processed by the on-board computing device 520 to detect objects in proximity to the vehicle 599. In addition or alternatively, the AV may transmit any of the data to an external server 570 for processing. Any known or to be known technique for making an object detection based on sensor data and/or captured images can be used in the embodiments disclosed in this document.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decisionmaking and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

The term "ego-vehicle" refers to a particular vehicle that is moving in an environment. When used in this document, the term "ego-vehicle" generally refers to an AV that is moving in an environment, with an autonomous vehicle control system (AVS) that is programmed to make decisions about where the AV will or will not move.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway, and a lane may be a portion of the airway. If the autonomous vehicle is a watercraft, then the term "street" or "road" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data (such as a dataset), programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

A "machine learning architecture", "machine learning model", or "model" refers to a set of algorithmic routines and parameters, stored on a computer-readable medium, that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

In this document, when relative terms of order such as "first" and "second" are used to modify a noun, such use is simply intended to distinguish one item from another, and is not intended to require a sequential order unless specifically stated.

The invention claimed is:

1. A method for operating a vehicle, comprising:
using, by a processor, a plurality of kinematic models to generate forecasted trajectories of an actor, the plurality of kinematic models being respectively associated with different actor types that are assigned to an actor detected in an environment of the vehicle;
obtaining, by the processor, levels of divergence for the forecasted trajectories from reference paths;
selecting, by the processor, a first kinematic model from the plurality of kinematic models based on the forecasted trajectories and a kinematic state of the actor, wherein a level of divergence associated with the forecasted trajectory generated using the first kinematic model is smallest one of the levels of divergences;

using, by the processor, the first kinematic model to predict a first path for the actor;

selecting, by the processor, a second kinematic model from the plurality of kinematic models responsive to movement of the actor no longer being consistent with typical movement of an object of one of the different actor types that is associated with the first kinematic model;

using, by the processor, the second kinematic model to predict a second path for the actor; and controlling, by the processor, operations of the vehicle based on the first and second paths.

2. The method according to claim 1, further comprising, prior to using the plurality of kinematic models to generate the forecasted trajectories, filtering the plurality of kinematic models to remove at least one kinematic model from the plurality of kinematic models that is associated with one of the different actor types with a lowest assigned probability for the actor.

3. The method according to claim 1, wherein the selecting the first kinematic model further comprises obtaining each one of the reference paths based on the kinematic state of the actor and a respective one of the different actor types.

4. The method according to claim 1, wherein the selecting the first kinematic model comprises identifying one of the forecasted trajectories which most closely matches an observed trajectory of the actor.

5. The method according to claim 1, wherein the selecting the first kinematic model comprises creating a hybrid kinematic model that includes a path follower algorithm of one of the plurality of kinematic models and a kinematics evaluator algorithm of another different one of the plurality of kinematic models.

6. The method according to claim 5, wherein the path following algorithm or the kinematics evaluator algorithm comprises part of the first kinematic model.

7. The method according to claim 6, wherein the using the first kinematic model to predict the first path for the actor comprising using the hybrid kinematic model to predict the first path for the actor.

8. The method according to claim 5, further comprising updating the path follower algorithm or the kinematics evaluator algorithm of the hybrid kinematic model based on results from evaluating predictions made by the hybrid kinematic model to actual actions of the actor.

9. A system, comprising:
a processor;
a non-transitory computer-readable storage medium comprising programming instructions that are configured to cause the processor to implement a method for operating a vehicle, wherein the programming instructions comprise instructions to:
use a plurality of kinematic models to generate forecasted trajectories of an actor, the plurality of kinematic models being respectively associated with different actor types that are assigned to an actor detected in an environment of the vehicle;
select a first kinematic model from the plurality of kinematic models based on the forecasted trajectories and a kinematic state of the actor, the first kinematic model is selected based on levels of divergence for the forecasted trajectories from reference paths and a level of divergence associated with the forecasted trajectory generated using the first kinematic model is smallest one of the levels of divergence;

use the first kinematic model to predict a first path for the actor;

select a second kinematic model from the plurality of kinematic models responsive to movement of the actor no longer being consistent with typical movement of an object of one of the different actor types that is associated with the first kinematic model;

use the second kinematic model to predict a second path for the actor; and control operations of the vehicle based on the first and second paths.

10. The system according to claim 9, wherein the programming instructions further comprise instructions to, prior to using the plurality of kinematic models to generate the forecasted trajectories, filter the plurality of kinematic models to remove at least one kinematic model from the plurality of kinematic models that is associated with one of the different actor types with a lowest assigned probability for the actor.

11. The system according to claim 9 wherein each one of the reference paths is obtained based on the kinematic state of the actor and a respective one of the different actor types.

12. The system according to claim 9, wherein the first kinematic model is selected by identifying one of the forecasted trajectories which most closely matches an observed trajectory of the actor.

13. The system according to claim 9, wherein the first kinematic model is selected by creating a hybrid kinematic model that includes a path follower algorithm of one of the plurality of kinematic models and a kinematics evaluator algorithm of another different one of the plurality of kinematic models.

14. The system according to claim 13, wherein the path following algorithm or the kinematics evaluator algorithm comprises part of the first kinematic model.

15. The system according to claim 14, wherein the hybrid kinematic model is used to predict the first path for the actor.

16. A non-transitory computer-readable medium that stores instructions that, when executed by at least one computing device, will cause the at least one computing device to perform operations comprising:
using a plurality of kinematic models to generate forecasted trajectories of an actor, the plurality of kinematic models being respectively associated with different actor types that are assigned to an actor detected in an environment of a vehicle;
selecting a first kinematic model from the plurality of kinematic models based on the forecasted trajectories and a kinematic state of the actor and by creating a hybrid kinematic model that includes a path follower algorithm of one of the plurality of kinematic models and a kinematics evaluator algorithm of another different one of the plurality of kinematic models;
using the first kinematic model to predict a first path for the actor;
selecting a second kinematic model from the plurality of kinematic models responsive to movement of the actor no longer being consistent with typical movement of an object of one of the different actor types that is associated with the first kinematic model;
using the second kinematic model to predict a second path for the actor;
controlling operations of the vehicle based on the first and second paths; and
updating the path follower algorithm or the kinematics evaluator algorithm of the hybrid kinematic model based on results from evaluating predictions made by the hybrid kinematic model to actual actions of the actor.

* * * * *